Aug. 22, 1933.  W. R. POOL  1,923,640
CREAM REMOVER
Filed June 10, 1932
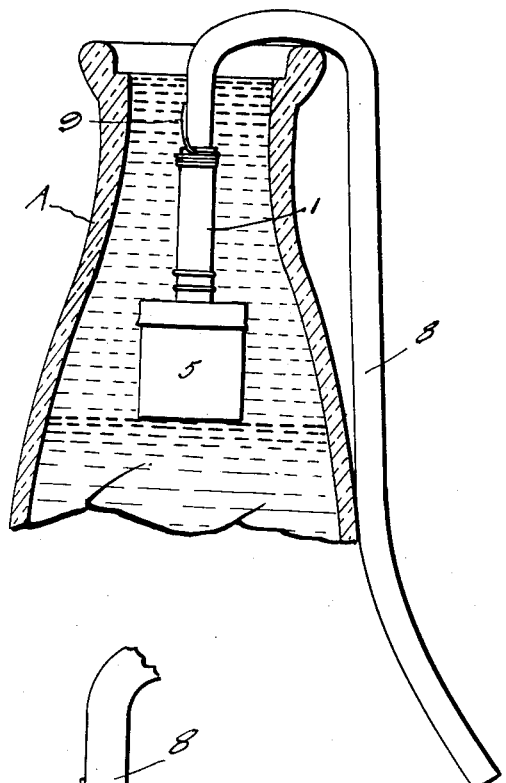
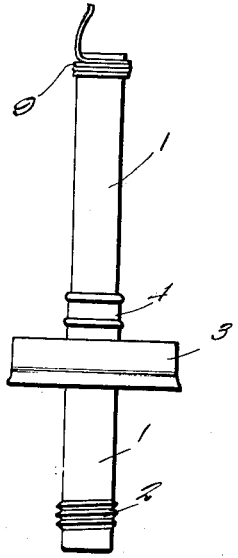
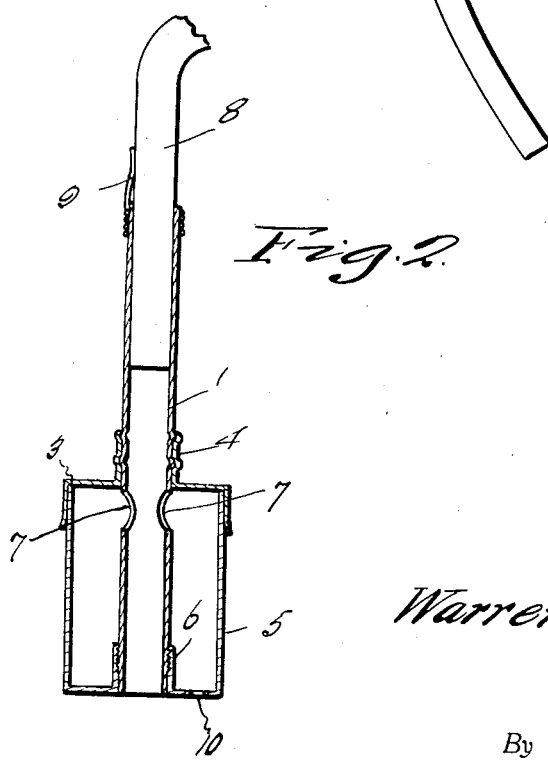
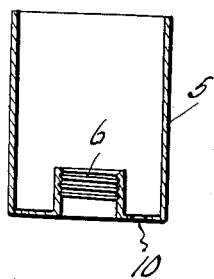
Warren R. Pool, Inventor
By Clarence A. O'Brien, Attorney Patented Aug. 22, 1933

1,923,640

UNITED STATES PATENT OFFICE 1,923,640

CREAM REMOVER

Warren R. Pool, Lincoln, Nebr.

Application June 10, 1932. Serial No. 616,547

1 Claim. (Cl. 137—20)

This invention relates to a cream remover, the general object of the invention being to provide means whereby cream can be easily and quickly removed from the top of a milk bottle or the like.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a sectional view of the top part of a milk bottle showing the invention in use.

Fig. 2 is a sectional view through the lower part of the device.

Fig. 3 is a view of the tube and the top member.

Fig 4 is a sectional view through the cup member.

In these views, the numeral 1 indicates a tube having threads 2 adjacent its lower end and a cap 3 attached to the intermediate part of the tube with the tube passing through a hole in the center of the cap and the cap may be provided with a nipple 4 which facilitates attachment of the cap to the tube.

A cup-shaped member 5 has an upwardly extending nipple 6 on its bottom which is threaded to receive the threaded part 2 of the tube, and when the parts are threaded together, the cap 3 will fit snugly on the upper end of the cup-shaped member to close the same.

The tube is also provided with the diametrically arranged openings 7 which are located under the cap. A bent tube 8 is adapted to be inserted into the tube 1 and the tube 8 is held in place by the spring 9 fastened to the upper end of the tube 1.

The bent tube is adjusted in the tube 1 in such a manner, that the bottom of the cup-shaped member 5 can be placed at the bottom level of the cream in the bottle A as shown in Fig. 1 and the outer end of the tube 8 extends below the rest of the device also as shown in Fig. 1. As the device is put in place, cream will enter the tubes 1 and 8 to an extent equal to the top level of the fluid in the bottle. The cream will slowly enter the cup-shaped member 5 through the opening 10 in the bottom of the member 5 and the entrance of this cream into the member 5 will force the air entrapped in the member 5 through the openings 7 into the column of cream in tubes 1 and 8 and thus form air bubbles which will force or carry the cream up and over the bent portion of the tube 8 resting on an edge of the bottle and then as the cream starts to flow down the outside portion of the tube 8 a siphon will be started and thus the cream will be removed from the top part of the bottle.

Thus I have provided a cream separator which can be easily cleaned and can be manufactured of several different materials. As will be seen the air bubbles are introduced into the column of cream above the point of the cream intake. By making the holes 7 relatively large in size, surface tension is overcome, permitting air in member 5 to be replaced by cream entering opening 10. As will be seen in Figure 2, the holes 7 are located at the top of the receptacle 5 and their combined areas is greater than the cross sectional area of the tube 8. This not only overcomes the surface tension set up by the liquid in the tube 8, but permits all the air in receptacle 5 to pass through the holes 7 into the tube and thus all of the air in the receptacle is utilized to start the siphon action. This arrangement, due to all the air in receptacle 5 being utilized, will permit a smaller receptacle 5 being used than if all the air in receptacle 5 were not used, it being evident than an efficient large bulky receptacle 5 would cause cream to overflow.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

Means for withdrawing cream collecting at the top of a receptacle containing milk comprising a cup-shaped member adapted to be placed in the cream with its bottom located adjacent the lower level of the cream, said member having its upper end open and its bottom formed with a nipple located in the member and opening out through the bottom, and said bottom having a hole therein located to one side of the nipple, a slip-on cap removably covering the top of the member and having an upstanding nipple thereon in alignment with the first mentioned nipple, a vertically arranged pipe having an intermediate portion passing through the nipple of the cap with its lower end threaded to the nipple on the bottom of the member, whereby the pipe and the cap can be removed from the member, said pipe having an enlarged opening or openings therein located immediately below the cap and of sufficient size to overcome the surface tension of the liquid set up in the tube at said hole or holes and a bent tube having one end removably connected with the upper end of the pipe.

WARREN R. POOL.